United States Patent
Weinberg et al.

(10) Patent No.: US 6,981,247 B2
(45) Date of Patent: Dec. 27, 2005

(54) COOPERATIVE SOFTWARE APPLICATION ARCHITECTURE

(75) Inventors: Amir Weinberg, Zoran (IL); Max Kholmyansky, Tel-Aviv (IL); Yaniv Shaya, Qiryat Bialik (IL); Moshe Cohen, Ra'anana (IL); Yossi Acrich, Modiin (IL)

(73) Assignee: Orsus Solutions Limited, Tortola (VG)

( * ) Notice: Subject to any disclaimer, the term of this patent is extended or adjusted under 35 U.S.C. 154(b) by 236 days.

(21) Appl. No.: 10/365,494

(22) Filed: Feb. 13, 2003

(65) Prior Publication Data

US 2003/0120731 A1 Jun. 26, 2003

Related U.S. Application Data

(62) Division of application No. 09/510,352, filed on Feb. 22, 2000, now abandoned.

(51) Int. Cl.[7] ............................................. G06F 9/44
(52) U.S. Cl. ................................ 717/127; 717/131
(58) Field of Search ............................... 717/127–135; 709/200, 201, 231–232; 714/15–16, 34; 705/500

(56) References Cited

U.S. PATENT DOCUMENTS

| | | | | |
|---|---|---|---|---|
| 5,283,868 A | * | 2/1994 | Baker et al. | 709/227 |
| 5,325,517 A | * | 6/1994 | Baker et al. | 714/11 |
| 5,530,804 A | * | 6/1996 | Edgington et al. | 714/30 |
| 5,712,971 A | * | 1/1998 | Stanfill et al. | 714/34 |
| 5,784,628 A | * | 7/1998 | Reneris | 714/24 |
| 6,378,068 B1 | * | 4/2002 | Foster et al. | 713/1 |
| 6,546,413 B1 | * | 4/2003 | Northrup | 709/200 |
| 6,546,443 B1 | * | 4/2003 | Kakivaya et al. | 714/15 |
| 6,684,261 B1 | * | 1/2004 | Orton et al. | 717/136 |

OTHER PUBLICATIONS

Hoppe. The Temporal Specification Techniques for Operating System Mechanisms. IEEE. 1989. pp. 293–297.*
Bodorik et al. Multi–view Memory to Support OS Locking for Transaction Systems. IEEE. 1997. pp. 309–318.*

* cited by examiner

*Primary Examiner*—Wei Y. Zhen
(74) *Attorney, Agent, or Firm*—Eitan, Pearl, Latzer & Cohen Zedek, LLP

(57) ABSTRACT

An application environment including a hosting application, and an application component operative to execute a plurality of ordered processing operations, where the hosting application is operative to effect a first call to the component, thereby invoking operation of the component, the component is operative to execute any of the ordered processing operations in response to the first call until a suspense condition is met, whereupon the component is operative to suspend its operation, maintain execution state information, and return execution control to the hosting application, the hosting application is operative to resolve the suspense condition and effect a second call to the component, and the component is operative to determine whether the suspense condition is resolved and, if so, resume execution of the ordered processing operations from the point of suspension in response to the second call.

18 Claims, 6 Drawing Sheets

COOPERATIVE SOFTWARE APPLICATION ARCHITECTURE

RELATED APPLICATION

The present application is a Divisional Application from U.S. patent application Ser. No. 09/510,352, filed Feb. 22, 2000 now abandoned.

FIELD OF THE INVENTION

The present invention relates to computer software architecture in general, and more particularly to systems and methods for cooperation between software applications.

BACKGROUND OF THE INVENTION

Cooperative software application architectures are well known. In one basic implementation of a cooperative software application architecture, a currently-executing application may invoke another not-currently-executing application in what is known as a "call." The "calling" application suspends its execution while the "called" application is executed. Once the called application terminates, execution control returns to the calling application whose execution continues from the point of suspension. The called application may be subsequently called, however the called application does not maintain execution state information from call to call. A call to an application must also specify the location within the called application from which point execution is to begin, otherwise the called application will begin execution from its first command. This is true even when the called application was called previously and where the called application terminated at a point other than the last command, as the called application does not "remember" between calls at which point it last terminated execution.

Limitations of known cooperative software application architectures may be seen with respect to Internet-based World Wide Web ("the web") electronic commerce ("e-commerce") applications. E-commerce applications such as Barnesandnoble.com and Amazon.com that may sell the same kind of items, in this case books, nevertheless have different interfaces for gathering similar purchase information such as customer name, address, credit card information, etc. Web based e-commerce agents such as MySimon.com and R-U-Sure.com provide prospective e-commerce shoppers with the ability to search several e-commerce web sites for a particular item in order to select the e-commerce site that maximizes their purchasing efficiency. However, such agents either direct shoppers to the e-commerce web site to make the purchase themselves A cooperative software application architecture could be applied to bridge such e-commerce and agent applications by devising a software proxy to interact with the e-commerce site that could be called from an agent host application. In such a scenario, the host application would gather the information required by the e-commerce web site from the shopper and send it to the proxy as part of the call to the proxy. However, where the e-commerce site requires different information at different stages in a purchase transaction, execution of the proxy would need to be suspended at each stage, and control returned to the host application for additional information to be gathered from the shopper. Unfortunately, although current cooperative software application architectures can support such multi-stage transactions through the use of event-driven or call-back techniques where the called application returns control to the host application to gather the required information, a subsequent call from the host application would result in the called application being executed from its first command, and not from the point of its suspension.

Another limitation inherent in known cooperative software application architectures is the inability of an interpreted calling application written in one programming language to share variables with an interpreted called application written in a different programming language. One reason for writing a cooperative software application using two different languages is that different aspects of the application might be best implemented in different languages. Although some programming languages do allow for code to include code snippets written in another language, there is no mechanism to allow the different code segments to share the same variables.

SUMMARY OF THE INVENTION

The present invention discloses systems and methods for cooperation between software applications that overcome limitations of the prior art. A cooperative software application architecture is provided whereby a hosting application calls an application, where the called application suspends its execution and returns control to the hosting application, and where the hosting application subsequently calls the called application, whereupon the called application resumes its execution from its earlier point of suspension. In a preferred embodiment of the present invention, the cooperative software application architecture is applied to act as an intermediary between web-based e-commerce applications and e-commerce agents.

There is thus provided in accordance with a preferred embodiment of the present invention an application environment including a hosting application, and an application component operative to execute a plurality of ordered processing operations, where the hosting application is operative to effect a first call to the component, thereby invoking operation of the component, the component is operative to execute any of the ordered processing operations in response to the first call until a suspense condition is met, whereupon the component is operative to suspend its operation, maintain execution state information, and return execution control to the hosting application, the hosting application is operative to resolve the suspense condition and effect a second call to the component, and the component is operative to determine whether the suspense condition is resolved and, if so, resume execution of the ordered processing operations from the point of suspension in response to the second call.

Further in accordance with a preferred embodiment of the present invention the suspense condition is met if at least one predefined datum is unavailable to the application component.

Still further in accordance with a preferred embodiment of the present invention the hosting application is operative to resolve the suspense condition by acquiring the predefined datum and make the predefined datum available to the application component.

Additionally in accordance with a preferred embodiment of the present invention the execution state information includes an instruction pointer indicating an instruction associated with the point of suspension.

Moreover in accordance with a preferred embodiment of the present invention the component is operative to resume execution of the ordered processing operations from the instruction indicated by the instruction pointer.

There is also provided in accordance with a preferred embodiment of the present invention a combination process-data flow diagram including a plurality of ordered and interconnected processing nodes depicted along at least one processing flow axis, and at least one data input/output node depicted along at least one data flow axis and being interconnected with at least one of the processing nodes.

Further in accordance with a preferred embodiment of the present invention the data flow axis is disposed generally perpendicular to the processing flow axis.

There is additionally provided in accordance with a preferred embodiment of the present invention a bridging system for bridging between an e-commerce application and an e-commerce agent application, the system including a plurality of e-commerce application servers, a bridging server in communication with the e-commerce application servers, the bridging server including a hosting application, and an application component operative to execute a plurality of ordered processing operations, where the hosting application is operative to effect a first call to the component, thereby invoking operation of the component, the component is operative to execute any of the ordered processing operations in response to the first call until a suspense condition is met, whereupon the component is operative to suspend its operation, maintain execution state information, and return execution control to the hosting application, the hosting application is operative to resolve the suspense condition and effect a second call to the component, and the component is operative to determine whether the suspense condition is resolved and, if so, resume execution of the ordered processing operations from the point of suspension in response to the second call, an e-commerce agent server in communication with the bridging server, and a client computer in communication with the e-commerce agent server, the client computer is operative to transmit purchase data to the e-commerce agent server, the e-commerce agent server is operative to transmit the purchase data to the bridging server, the bridging server is operative to cause the hosting application to invoke the component and execute the ordered processing operations, and the ordered processing operations are operative to effect a purchase via the e-commerce application using the purchase data.

Further in accordance with a preferred embodiment of the present invention the bridging server includes a plurality of scripts, the each script includes a plurality of the ordered processing operations representing processing and data flow of one of the e-commerce applications.

Still further in accordance with a preferred embodiment of the present invention the purchase data includes an indication of a selected one of the e-commerce applications, and the bridging server is operative to cause the hosting application to invoke the component to execute the script representing the selected e-commerce application.

Additionally in accordance with a preferred embodiment of the present invention the e-commerce agent server and the bridging server are implemented in a single server.

Moreover in accordance with a preferred embodiment of the present invention the bridging server provides a unified interface to the e-commerce agent server for the plurality of e-commerce application servers.

There is also provided in accordance with a preferred embodiment of the present invention a system for sharing variables between two different programming languages, the system including a hosting language interpreter operative to interpret and execute a hosting script written in a first programming language a, a hosted language interpreter operative to interpret and execute a hosted script written in a second programming language B, at least one variable maintained by the hosting language interpreter, and an interface for the hosted language interpreter to access the variable.

Further in accordance with a preferred embodiment of the present invention a portion of the hosted script is included within the hosting script, and the hosting language interpreter is operative to call the hosted language interpreter to execute the portion.

Still further in accordance with a preferred embodiment of the present invention the hosted language interpreter is operative to request the value of the variable through the interface, whereupon the hosting language interpreter provides the value of the variable to the hosted language interpreter.

Additionally in accordance with a preferred embodiment of the present invention the hosted language interpreter is operative to instruct the hosting language interpreter through the interface to change the value of the variable, whereupon the hosting language interpreter changes the value of the variable.

Moreover in accordance with a preferred embodiment of the present invention the interface includes means for instructing the hosting language interpreter to add and remove variables directly within the hosting language interpreter.

Further in accordance with a preferred embodiment of the present invention the interface is implemented as a Common Object Model (COM) wrapper component including at least one property for storing the value of the variable.

Still further in accordance with a preferred embodiment of the present invention the hosting language interpreter provides hosted language interpreter with access to the interface by adding the COM component to a scripting engine name space of the hosted language interpreter and by exposing the COM component's properties and methods as global variables and methods to the hosted language interpreter.

There is also provided in accordance with a preferred embodiment of the present invention in an application environment including a hosting application and an application component operative to execute a plurality of ordered processing operations, a method of operation including the steps of the hosting application first calling the component, thereby invoking operation of the component, the component executing any of the ordered processing operations in response to the first call until a suspense condition is met, suspending operation of the component, maintaining execution state information of the component, returning execution control to the hosting application, resolving the suspense condition, the hosting application second calling the component, determining whether the suspense condition is resolved, and, if so resuming execution of the ordered processing operations from the point of suspension in response to the second calling.

Further in accordance with a preferred embodiment of the present invention the suspending step includes suspending if at least one predefined datum is unavailable to the application component.

Still further in accordance with a preferred embodiment of the present invention the resolving step includes resolving the suspense condition by acquiring the predefined datum and making the predefined datum available to the application component.

Additionally in accordance with a preferred embodiment of the present invention the maintaining step includes maintaining an instruction pointer indicating an instruction associated with the point of suspension.

Moreover in accordance with a preferred embodiment of the present invention the resuming step includes resuming execution of the ordered processing operations from the instruction indicated by the instruction pointer.

There is additionally provided in accordance with a preferred embodiment of the present invention a method for representing process and data flow in combination, the method including the steps of depicting in a diagram a plurality of ordered and interconnected processing nodes along at least one processing flow axis, and depicting in the diagram at least one data input/output node along at least one data flow axis and interconnected with at least one of the processing nodes.

Further in accordance with a preferred embodiment of the present invention the second depicting step includes disposing the data input/output node generally perpendicular to the processing flow axis.

There is also provided in accordance with a preferred embodiment of the present invention in a system including a plurality of e-commerce application servers, an e-commerce agent server, and a client computer in communication with the e-commerce agent server, a method for bridging between an e-commerce application and an e-commerce agent application, the method including the steps of providing a bridging server in communication with the e-commerce application servers, the bridging server including a hosting application, and an application component operative to execute a plurality of ordered processing operations, where the hosting application is operative to effect a first call to the component, thereby invoking operation of the component, the component is operative to execute any of the ordered processing operations in response to the first call until a suspense condition is met, whereupon the component is operative to suspend its operation, maintain execution state information, and return execution control to the hosting application, the hosting application is operative to resolve the suspense condition and effect a second call to the component, and the component is operative to determine whether the suspense condition is resolved and, if so, resume execution of the ordered processing operations from the point of suspension in response to the second call, placing the e-commerce agent server in communication with the bridging server, transmitting purchase data from the client computer to the e-commerce agent server, transmitting the purchase data from the e-commerce agent server to the bridging server, causing the hosting application to invoke the component and execute a script of the ordered processing operations, thereby effecting a purchase via the e-commerce application using the purchase data.

Further in accordance with a preferred embodiment of the present invention the purchase data includes an indication of a selected one of the e-commerce applications, and the causing step includes causing the hosting application to invoke the component to execute a script representing the selected e-commerce application.

Still further in accordance with a preferred embodiment of the present invention the bridging server provides a unified interface to the e-commerce agent server for the plurality of e-commerce application servers.

There is additionally provided in accordance with a preferred embodiment of the present invention a method for sharing variables between two different programming languages, the method including the steps of interpreting and executing at a hosting language interpreter a hosting script written in a first programming language a, interpreting and executing at a hosted language interpreter a hosted script written in a second programming language B, maintaining at least one variable at the hosting language interpreter, and accessing the variable from the hosted language interpreter via the interface.

Further in accordance with a preferred embodiment of the present invention a portion of the hosted script is included within the hosting script, and further including calling the hosted language interpreter from the hosting language interpreter to execute the portion.

Still further in accordance with a preferred embodiment of the present invention the method further includes the hosted language interpreter requesting the value of the variable through the interface, whereupon the hosting language interpreter provides the value of the variable to the hosted language interpreter.

Additionally in accordance with a preferred embodiment of the present invention the method further includes the hosted language interpreter instructing the hosting language interpreter through the interface to change the value of the variable, whereupon the hosting language interpreter changes the value of the variable.

Moreover in accordance with a preferred embodiment of the present invention the method further includes the hosted language interpreter instructing the hosting language interpreter to add and remove variables directly within the hosting language interpreter.

Further in accordance with a preferred embodiment of the present invention the interface is implemented as a Common Object Model (COM) wrapper component including at least one property for storing the value of the variable.

Still further in accordance with a preferred embodiment of the present invention the method further includes the hosting language interpreter providing the hosted language interpreter with access to the interface by adding the COM component to a scripting engine name space of the hosted language interpreter and by exposing the COM component's properties and methods as global variables and methods to the hosted language interpreter.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
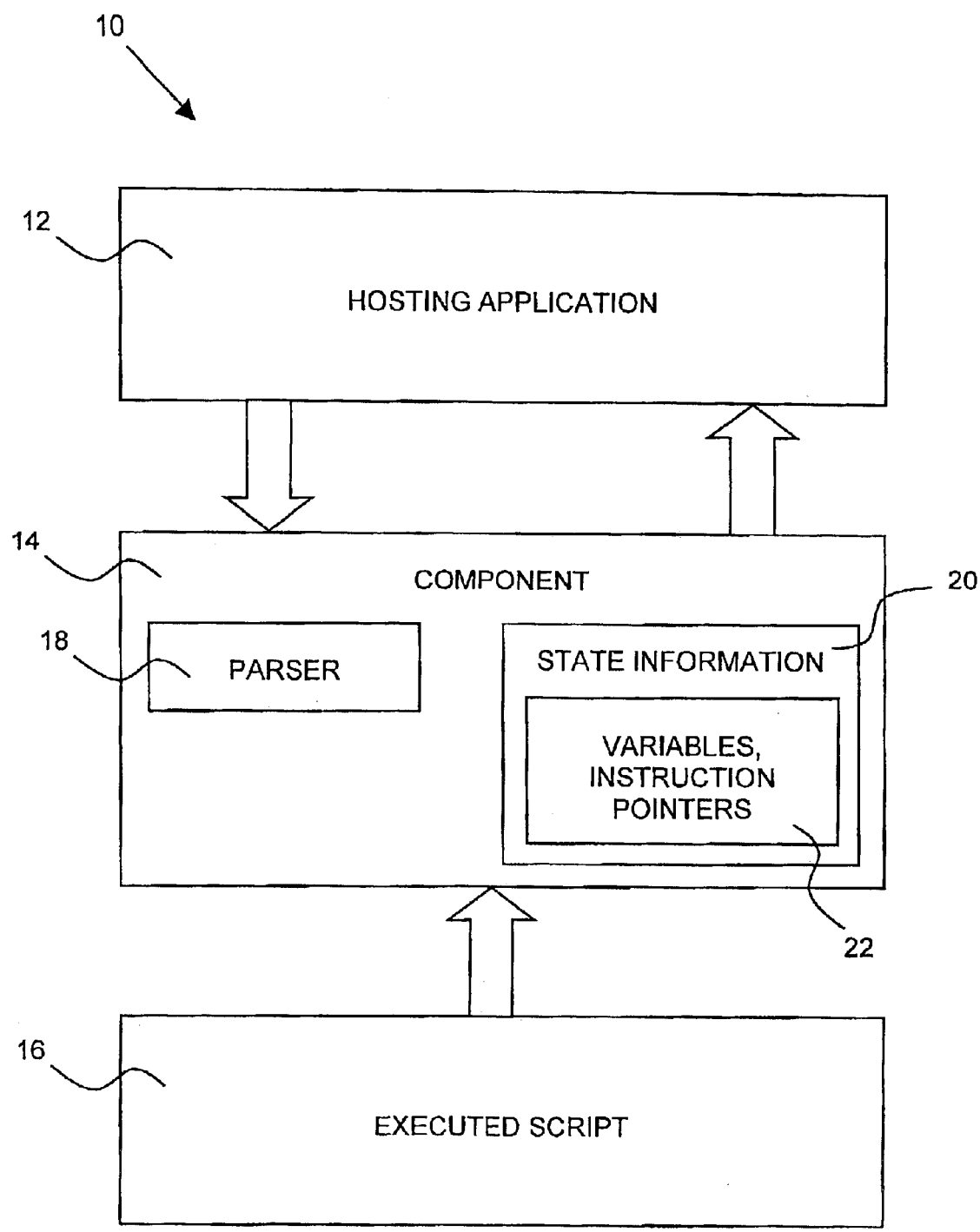
FIG. 1 is a simplified block diagram of a cooperative software application architecture, constructed and operative in accordance with a preferred embodiment of the present invention.

Reference is now made to FIG. 1 which is a simplified block diagram of a cooperative software application architecture, constructed and operative in accordance with a preferred embodiment of the present invention. An architecture, generally designated 10, is shown in FIG. 1 as having a hosting application 12 which calls a component 14 to invoke the execution of component 14. Component 14 is preferably configured to execute a script 16 in response to a call from hosting application 12, which script component 14 parses via a parser 18. Component 14 is also preferably configured to maintain execution state information 20 which preferably includes variables and an instruction pointer 22.

Hosting application 12 may be written in any suitable programming language or tool (e.g. Visual Basic, C++, Java, etc.) that is capable of calling external applications, and component 14 in any language or tool that supports being called by another application. Component 14 is preferably adapted to run a script or other ordered sequence of instructions upon being called by hosting application 12, and possesses the ability to suspend its execution at any point, return control to hosting application 12, and later resume its execution from the point of suspension upon subsequently being called by the hosting application 12.

Hosting application 12 may call component 14 through any known interface, such as the Common Object Model (COM) interface developed by Microsoft Corporation of Redmond, Wash. Component 14 is preferably configured to execute, in response to a call by hosting application 12, an ordered sequence of instructions until a predefined suspense condition is reached, such as the need for certain data not available to component 14. When the predefined suspense condition is reached, component 14 suspends its execution and maintains all current execution state information 20 including all variables and an instruction pointer 22 indicating the current instruction at which point component 14 reached the predefined suspense condition. Component 14 then returns execution control to hosting application 12 along with a notification describing the nature of the redefined suspense condition which caused component 14 to suspend its execution.

Upon receiving execution control from component 14, hosting application 12 may attempt to resolve the current suspense condition at component 14, such as by acquiring data required by component 14 for further execution of script 16. Hosting application 12 then calls component 14 and provides whatever is required by component 14 to resolve its current suspense condition, such as by passing data to component 14 or otherwise making such data available to component 14 using conventional techniques or as otherwise described hereinbelow with reference to FIGS. 5 and 6. It is a particular feature of the present invention that hosting application 12 calls component 14 without specifying the point from which component 14 should begin executing script 16. Rather, component 14, having maintained its execution state information 20 including the instruction pointer 22 indicating the instruction at which point component 14 previously suspended its execution, simply continues to execute script 16 from the instruction indicated by instruction pointer 22, provided that component 14 is satisfied that the suspense condition was truly resolved by hosting application 12.

Figure 2:
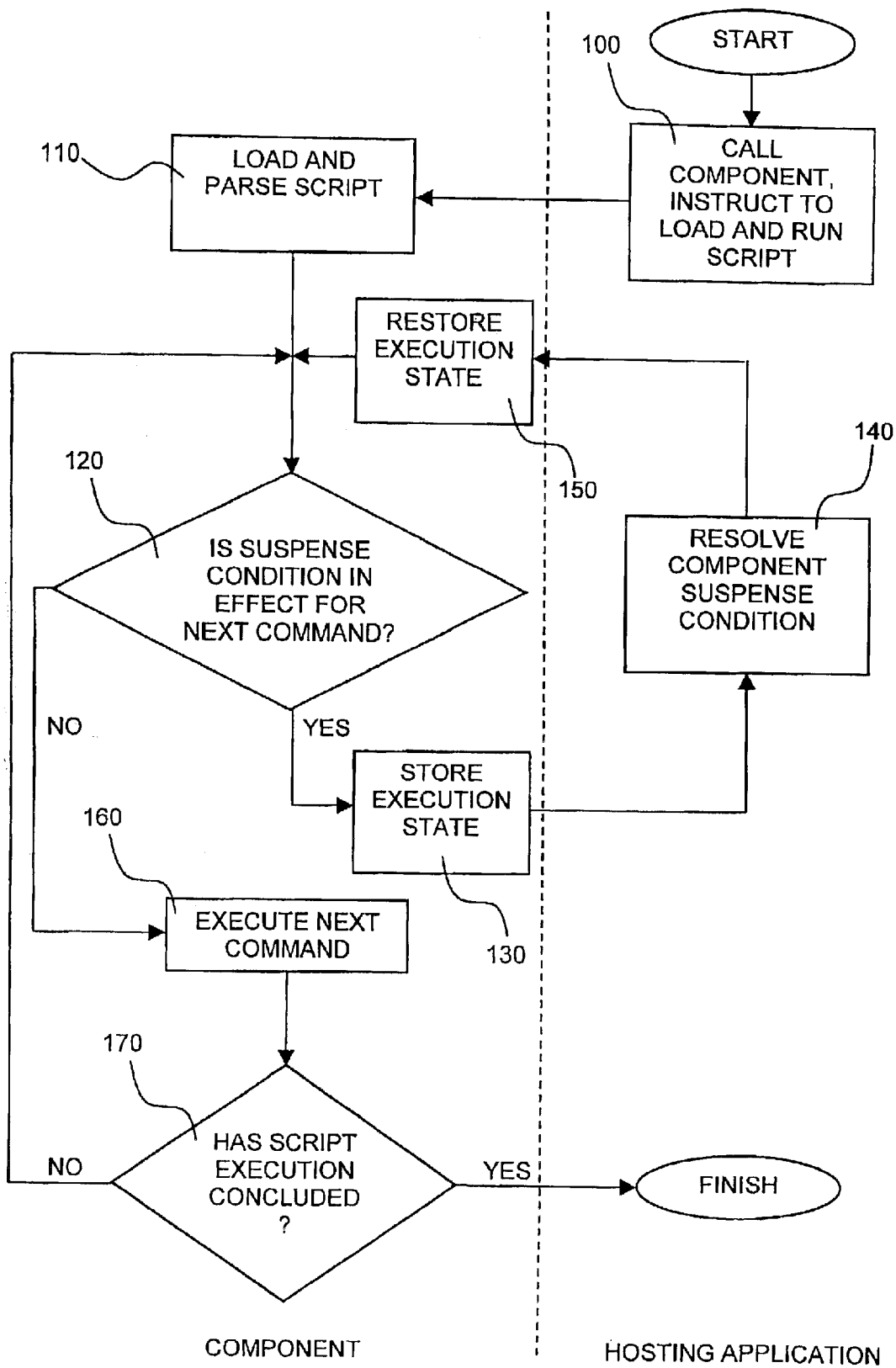
FIG. 2 is a simplified flowchart illustration of a exemplary method of operation of the architecture of FIG. 1, operative in accordance with a preferred embodiment of the present invention.

Additional reference is now made to FIG. 2, which is a simplified flowchart illustration of a exemplary method of operation of the architecture of FIG. 1, operative in accordance with a preferred embodiment of the present invention. In the method of FIG. 2 hosting application 12 calls component 14 and instructs component 14 to load script 16 for execution (step 100). Component 14 loads and parses the script, and begins executing the script according to script 16's order of processing operations (step 110). Various processing operations in the script may have an associated suspense condition indicating that an operation has certain requirements without which the operation may not be executed (e.g., required data in variables). When an operation is reached and its suspense condition is met (i.e., the requirements are not present) (step 120), component 14 suspends its execution and stores its current execution state in order to be able to return to that state (step 130). The execution state may include the values of variables known to component 14 as well as a pointer to the script instruction at which execution was suspended. Component 14 then returns control to hosting application 12, indicating that component 14 has suspended its execution and reporting the nature of the suspense condition. Hosting application 12 then takes whatever steps are necessary to resolve component 14's suspense condition, such as by gathering data from an e-commerce customer (step 140). Hosting application 12 then accesses component 14's interface and instructs it to continue execution, providing component 14 with whatever is needed to resolve the suspense condition. Component 14 evaluates the attempt to resolve its suspense condition and, if it is satisfied, restores the execution state from the point of its suspension (step 150). Component 14 then continues to execute script 16 from the suspended operation (step 160) until script execution naturally terminates (step 170).

Figure 3:
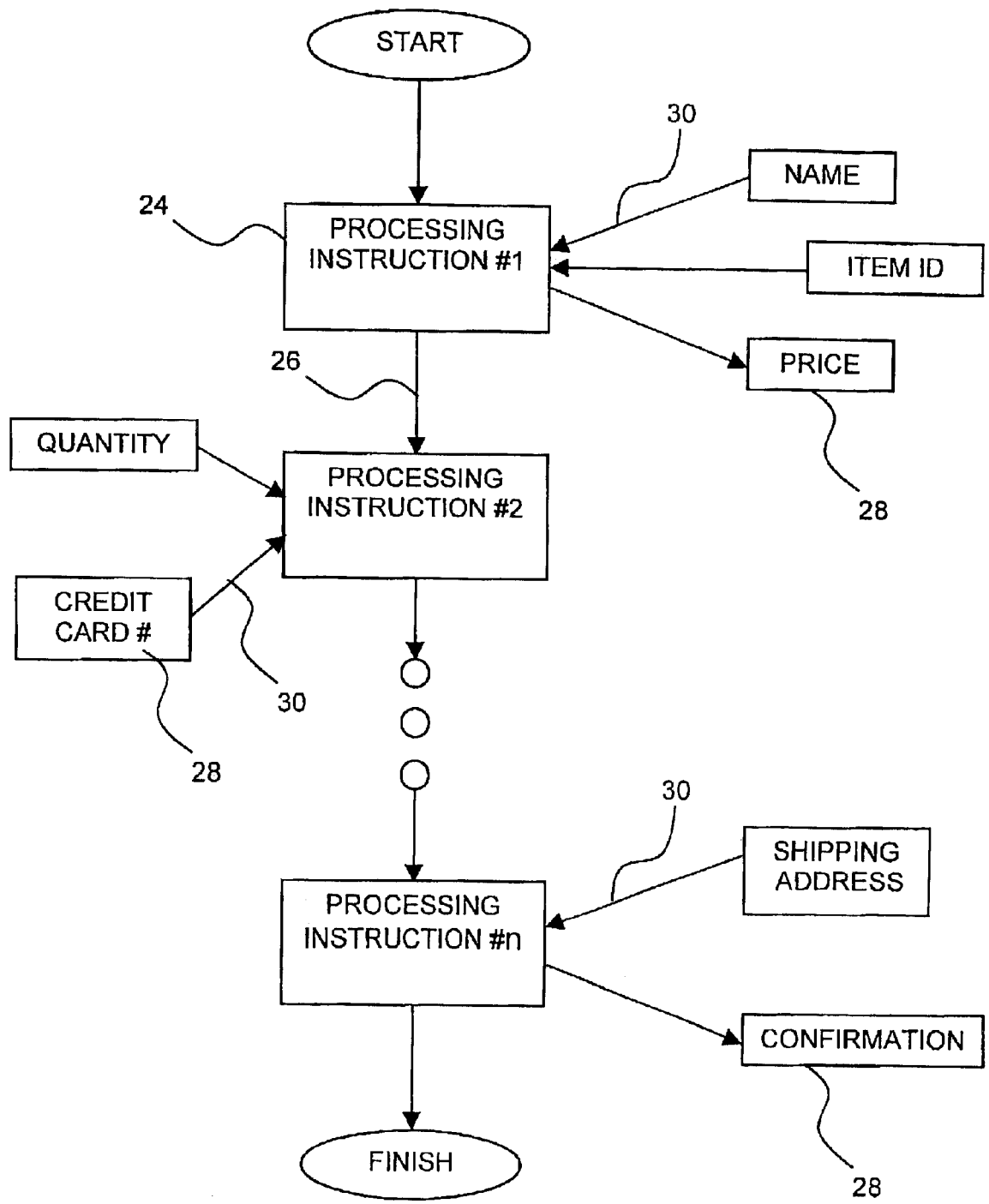
FIG. 3 is a simplified illustration of a combination process-data flow diagram useful in understanding the cooperative software application architecture of FIG. 1 and the exemplary method of operation of FIG. 2, constructed and operative in accordance with a preferred embodiment of the present invention.

Reference is now made to FIG. 3 which is a simplified illustration of a combination process-data flow diagram useful in understanding the cooperative software application architecture of FIG. 1 and the exemplary method of operation of FIG. 2, constructed and operative in accordance with a preferred embodiment of the present invention. The ordered processing operations of script 16 (FIG. 1) may be represented as shown in FIG. 3 as ordered and interconnected processing nodes 24 depicted along a processing flow axis 26. Data input or output associated with a processing node is represented as data input/output nodes 28 depicted along a data flow axis 30 interconnected with its related processing node 24. Data flow axis 30 does not lie along processing flow axis 26 and is preferably generally perpendicular to processing flow axis 26 so that it may be identified at a glance as a data flow and not as a processing flow. Preferably, different colors are used to distinguish processing flow axis 26 and data flow axis 30.

Figure 4:
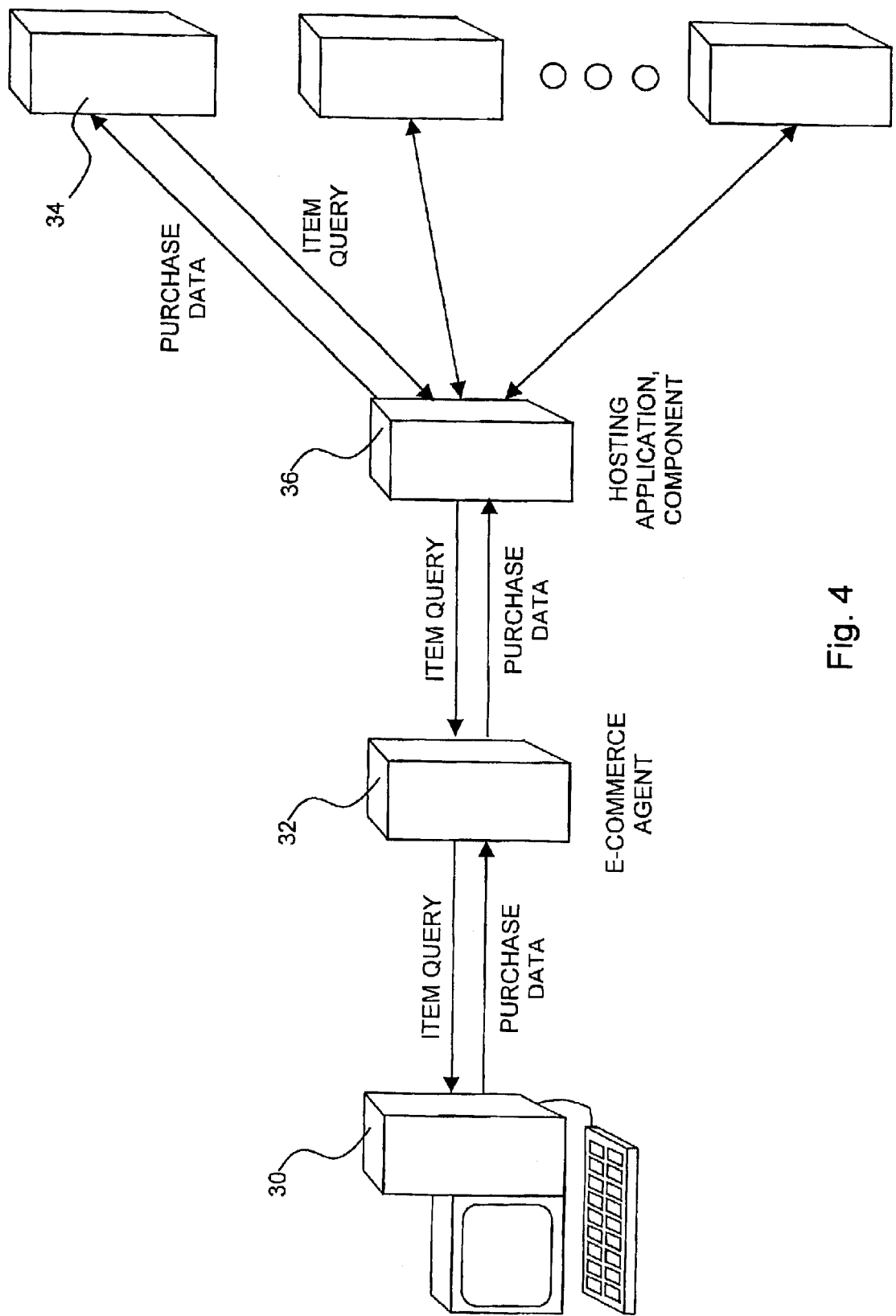
FIG. 4 is a simplified illustration of the cooperative software application architecture of FIGS. 1 and 2 implemented as a bridging system between e-commerce and e-commerce agent applications, constructed and operative in accordance with a preferred embodiment of the present invention.

Reference is now made to FIG. 4 which is a simplified illustration of the cooperative software application architecture of FIGS. 1 and 2 implemented as a bridging system between e-commerce and e-commerce agent applications, constructed and operative in accordance with a preferred embodiment of the present invention. In the system of FIG. 4 a prospective shopper uses a client computer 30 to access an e-commerce agent at a server 32 via a network, such as the Internet, in search of a particular item for purchase. Using conventional techniques, the e-commerce agent at a server 32 indicates to the shopper at which e-commerce site the item may be found. Normally, the shopper would then directly access the desired e-commerce site directly at a server 34. However, server 32 is preferably configured to gather purchasing information, including the desired e-commerce site, credit card information, etc., directly from the shopper and provide the information to a bridging server 36. Server 36 is preferably configured with hosting application 12 and component 14 of FIG. 1, as well as one or more scripts 16, each representing the process and data flow of a different e-commerce application at the various e-commerce servers 34, including the e-commerce application of particular interest to the shopper. Thus, server 36 provides a unified interface to server 32 via which purchasing information required by different e-commerce sites and using different interfaces may be gathered.

In response to the shopper having indicated to server 32 that the shopper wishes to purchase the item at a particular e-commerce server 34, and server 32 having conveyed this information to server 36, the hosting application 12 at server 36 invokes component 14 and instructs component 14 to run the script 16 associated with the desired e-commerce web site. Purchase data required by the e-commerce application represents a suspense condition that causes component 14 to return execution control to hosting application 12 in an attempt to resolve the suspense condition, such as by providing data gathered from the shopper by server 32 in the format required by the selected e-commerce server 34. The required data having been gathered, hosting application 12 at server 36 again calls component 14 and provides component 14 with the required data, thus resolving the suspense condition. Component 14 then continues execution of the script, ultimately effecting the shopper's purchase of the item without the shopper having accessed the e-commerce site directly at server 34, but, rather, indirectly by way of servers 32 and 36. It is appreciated that the functionality of servers 32 and 36 may be combined into a single server configured with an e-commerce agent, hosting application 12, and component 14.

Figure 5:
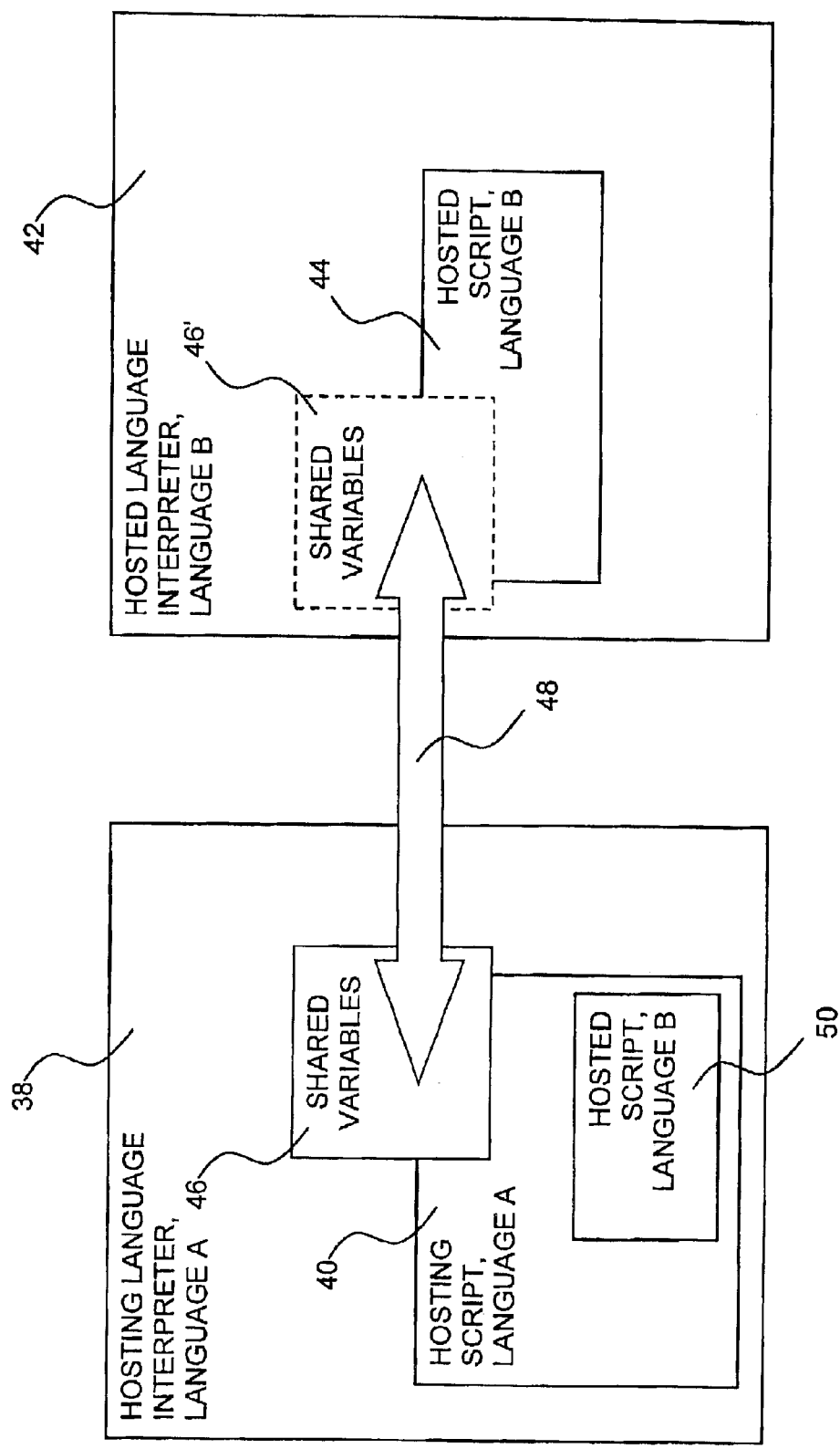
FIG. 5 is a simplified block diagram of a system for sharing variables between two different programming languages, constructed and operative in accordance with a preferred embodiment of the present invention.

Reference is now made to FIG. 5 which is a simplified block diagram of a system for sharing variables between two different programming languages, constructed and operative in accordance with a preferred embodiment of the present invention. The system of FIG. 5 is useful with the cooperative software application architecture of FIGS. 1 and 2 where hosting application 12 and component 14 are each implemented in a different programming language. The system of FIG. 5 includes a hosting language interpreter 38 capable of interpreting and executing a hosting script 40 written in a programming language A, a hosted language interpreter 42 capable of interpreting and executing a hosted script 44 written in a programming language B, shared variables 46, and an interface 48 for allowing hosted language interpreter 42 to access shared variables 46. Portions 50 of hosted script 44 in language B may be included within hosting script 40 written in language A, with interpreter 38 having a mechanism to call interpreter 42 to interpret and execute portions 50 in accordance with techniques well known in the art.

Interpreter 42 and script 44 may gain access to shared variables 46 as follows. The values of the variables of hosting language interpreter 38 are typically held by hosting language interpreter 38, although they are accessible for both read and write access to hosted language interpreter 42 using interface 48. The hosting language typically defines the exact mechanism through which shared variables 46 may be accessed for read/write and for adding and removing variables within the hosting language environment. When hosted language script 44 requires a variable value, hosted language interpreter 42 requests the value of the variable through interface 48. The hosting language interpreter 38 then provides the requested variable value to the hosted language interpreter 42. Conversely, when hosted language script 44 wishes to change a variable value, hosted language interpreter 42 instructs hosting language interpreter 38 through interface 48 to change the value of the variable. The hosting language interpreter 38 then changes the associated shared variable 46.

Interface 48 may also provide means for adding and removing variables directly within hosting language interpreter 38. Thus, hosted language interpreter 42 may use these methods to instruct the hosting language interpreter 38 to add or remove shared variables directly within hosting language interpreter 38 in response to commands in hosted script 44 that add and remove variables. Hosting language interpreter 38 in turn adds or removes the variables as instructed.

Figure 6:
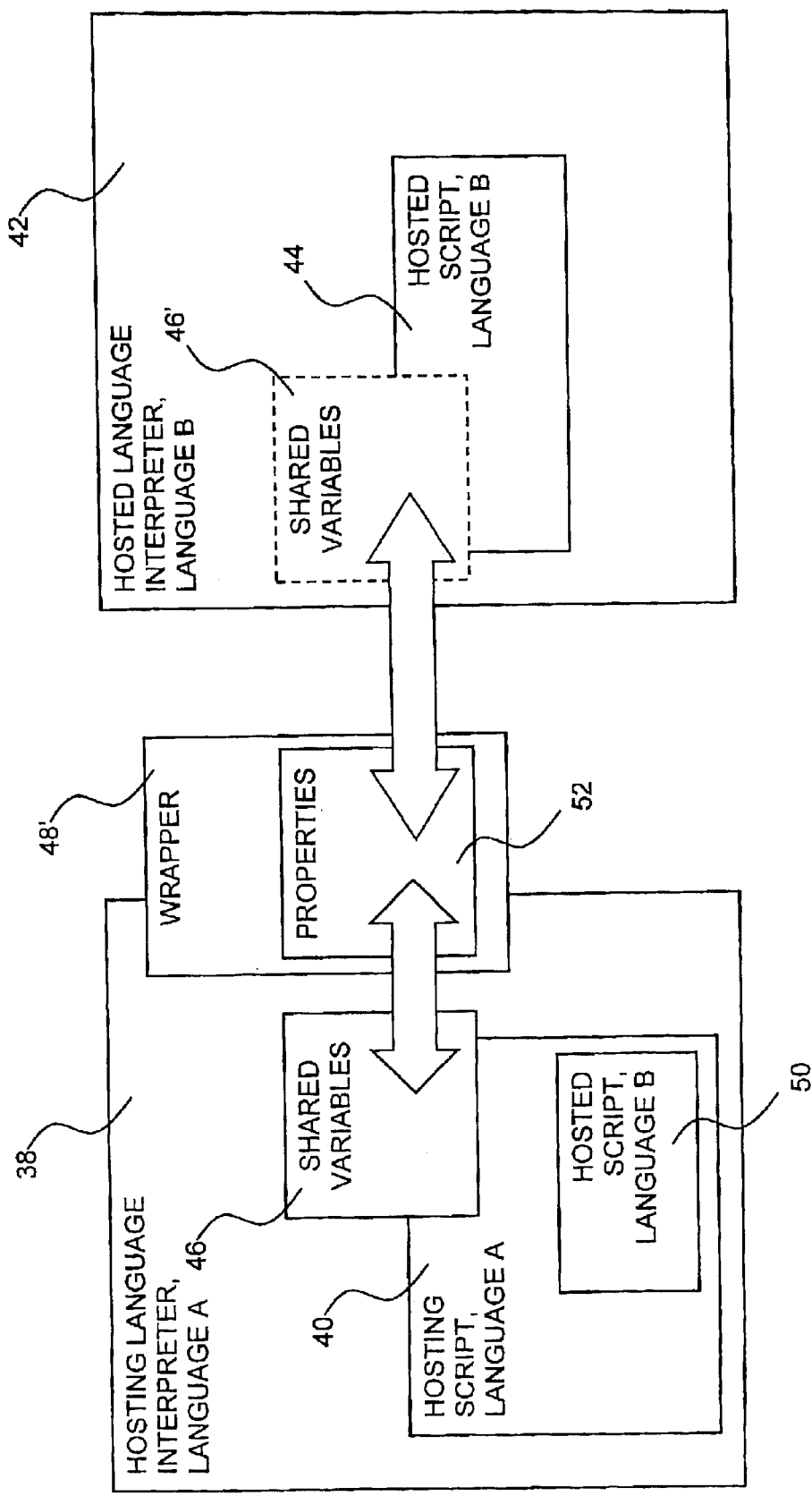
FIG. 6 is a simplified block diagram of an exemplary implementation of the system of FIG. 5, constructed and operative in accordance with a preferred embodiment of the present invention.

The system of FIG. 5 may be implemented using Microsoft Active Scripting and the Common Object Model (COM) interface developed by Microsoft Corporation of Redmond, Wash., as seen with reference to FIG. 6. In FIG. 6 interface 48 of FIG. 5 is implemented as a wrapper 48' having properties 54. Language A may be any language that is capable of including snippets in VBSCRIPT, JSCRIPT, or any other scripting language that has an implementation that supports Microsoft Active Scripting, Hosting language interpreter 38 preferably creates wrapper 48', to which properties 54 can be dynamically added and removed. An example of such a wrapper is a Common Object Model (COM) component which implements the IDispatchEx interface. Hosting language interpreter 38 is capable of adding a property 54 to wrapper 48' that corresponds to a variable that is defined by hosting script 40, with the name of the property preferably having the same name as the variable. Hosting language interpreter 38 then provides hosted language interpreter 42 with access to wrapper 48', such as, in the case of a COM component, by adding the COM component to the hosted language interpreter's scripting engine name space (e.g., by using the IActiveScript::AddNamedItem method), and in such a way that the COM component's properties and methods are exposed as global variables and methods to hosted language interpreter 42 (e.g., by using the flag SCRIPTITEM_GLOBALMEMBERS of the above method).

The values of the variables of hosting language interpreter 38 are typically held by hosting language interpreter 38, although they are accessible to hosted language interpreter 42 as is represented at reference numeral 46'. When hosted language script 44 requires a variable value, hosted language interpreter 42 requests the value of the property 54 associated with the variable from wrapper 48'. Wrapper 48' in turn requests the associated variable 46 from hosting language interpreter 38 which provides it to wrapper 48' which in turn provides it to hosted language interpreter 42. Conversely, when hosted language script 44 wishes to change a variable value, hosted language interpreter 42 instructs wrapper 48' to change the value of the property 54 associated with the variable. Wrapper 48' in turn instructs hosting language interpreter 38 to change the associated variable 46.

Some methods of the COM component are adapted for adding and removing variables directly to hosting language interpreter 38. Therefore, hosted language interpreter 42 may use these methods to add and remove shared variables directly to hosting language interpreter 38. hosting language interpreter 38 then adds these as properties 54 as described above.

Other implementations and variations of the system of FIG. 5 that would occur to those skilled in the art include one where the shared variables are maintained by the hosted language environment rather than the hosting language environment. In such an implementation the hosting language interpreter 38 would access the variables of the hosted language interpreter 42 through the interface 48. Alternatively, the variables may be maintained in third environment that may be accessed by both hosting language interpreter 38 and hosted language interpreter 42 through the interface 48.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. An application environment comprising:
    a hosting application; and
    an application component operative to execute a plurality of ordered processing operations,
    wherein said hosting application is operative to effect a first call to said component, thereby invoking operation of said component,
    wherein said component is operative to execute any of said ordered processing operations in response to said first call until a suspense condition is met, whereupon said component is operative to suspend its operation, maintain execution state information, and return execution control to said hosting application,
    wherein said hosting application is operative to resolve said suspense condition and effect a second call to said component, and
    wherein said component is operative to determine whether said suspense condition is resolved and, if so, resume execution of said ordered processing operations from the point of suspension in response to said second call.

2. An application environment according to claim 1 wherein said suspense condition is met if at least one predefined datum is unavailable to said application component.

3. An application environment according to claim 2 wherein said hosting application is operative to resolve said suspense condition by acquiring said predefined datum and make said predefined datum available to said application component.

4. An application environment according to claim 1 wherein said execution state information includes an instruction pointer indicating an instruction associated with said point of suspension.

5. An application environment according to claim 4 wherein said component is operative to resume execution of said ordered processing operations from said instruction indicated by said instruction pointer.

6. A bridging system for bridging between an e-commerce application and an e-commerce agent application, the system comprising:
    a plurality of e-commerce application servers;
    a bridging server in communication with said e-commerce application servers, said bridging server comprising:
        a hosting application; and
        an application component operative to execute a plurality of ordered processing operations,
        wherein said hosting application is operative to effect a first call to said component, thereby invoking operation of said component,
        wherein said component is operative to execute any of said ordered processing operations in response to said first call until a suspense condition is met, whereupon said component is operative to suspend its operation, maintain execution state information, and return execution control to said hosting application,
        wherein said hosting application is operative to resolve said suspense condition and effect a second call to said component, and
        wherein said component is operative to determine whether said suspense condition is resolved and, if so, resume execution of said ordered processing operations from the point of suspension in response to said second call;
    an e-commerce agent server in communication with said bridging server; and
    a client computer in communication with said e-commerce agent server,
    wherein said client computer is operative to transmit purchase data to said e-commerce agent server,
    wherein said e-commerce agent server is operative to transmit said purchase data to said bridging server,
    wherein said bridging server is operative to cause said hosting application to invoke said component and execute said ordered processing operations, and
    wherein said ordered processing operations are operative to effect a purchase via said e-commerce application using said purchase data.

7. A bridging system according to claim 6 wherein said bridging server comprises a plurality of scripts, wherein each script comprises a plurality of said ordered processing operations representing processing and data flow of one of said e-commerce applications.

8. A bridging system according to claim 7 wherein said purchase data includes an indication of a selected one of said e-commerce applications, and wherein said bridging server is operative to cause said hosting application to invoke said component to execute said script representing said selected e-commerce application.

9. A bridging system according to claim 6 wherein said e-commerce agent server and said bridging server are implemented in a single server.

10. A bridging system according to claim 6 wherein said bridging server provides a unified interface to said e-commerce agent server for said plurality of e-commerce application servers.

11. In an application environment including a hosting application and an application component operative to execute a plurality of ordered processing operations, a method of operation comprising the steps of:
    said hosting application first calling said component, thereby invoking operation of said component;
    said component executing any of said ordered processing operations in response to said first call until a suspense condition is met, suspending operation of said component, maintaining execution state information of said components, returning execution control to said hosting application, said hosting application resolving said suspense condition;

said hosting application second calling said component; said component determining whether said suspense condition is resolved;

resuming execution of said ordered processing operations from the point of suspension in response to said second calling.

12. A method according to claim 11 wherein said suspending step comprises suspending if at least one predefined datum is unavailable to said application component.

13. A method according to claim 12 wherein said resolving step comprises resolving said suspense condition by acquiring said predefined datum and making said predefined datum available to said application component.

14. A method according to claim 11 wherein said maintaining step comprises maintaining an instruction pointer indicating an instruction associated with said point of suspension.

15. A method according to claim 14 wherein said resuming step comprises resuming execution of said ordered processing operations from said instruction indicated by said instruction pointer.

16. In a system including a plurality of e-commerce application servers, an e-commerce agent server, and a client computer in communication with said e-commerce agent server, a method for bridging between an e-commerce application and an e-commerce agent application, the method comprising the steps of:

providing a bridging server in communication with said e-commerce application servers, said bridging server comprising:
  a hosting application; and
  an application component operative to execute a plurality of ordered processing operations, wherein said hosting application is operative to effect a first call to said component, thereby invoking operation of said component, wherein said component is operative to execute any of said ordered processing operations in response to said first call until a suspense condition is met, whereupon said component is operative to suspend its operation, maintain execution state information, and return execution control to said hosting application, wherein said hosting application is operative to resolve said suspense condition and effect a second call to said component, and wherein said component is operative to determine whether said suspense condition is resolved and, if so, resume execution of said ordered processing operations from the point of suspension in response to said second call;

placing said e-commerce agent server in communication with said bridging server;

transmitting purchase data from said client computer to said e-commerce agent server;

transmitting said purchase data from said e-commerce agent server to said bridging server;

causing said hosting application to invoke said component and execute a script of said ordered processing operations, thereby effecting a purchase via said e-commerce application using said purchase data.

17. A method according to claim 16 wherein said purchase data includes an indication of a selected one of said e-commerce applications, and wherein said causing step comprises causing said hosting application to invoke said component to execute a script representing said selected e-commerce application.

18. A method system according to claim 16 wherein said bridging server provides a unified interface to said e-commerce agent server for said plurality of e-commerce application servers.

\* \* \* \* \*